(12) United States Patent
Takayanagi et al.

(10) Patent No.: US 7,108,297 B2
(45) Date of Patent: Sep. 19, 2006

(54) QUICK CONNECTOR

(75) Inventors: Akira Takayanagi, Aichi-ken (JP); Yoshimitsu Ishida, Aichi-ken (JP)

(73) Assignee: Tokai Rubber Industries, Inc., (JP)

( * ) Notice: Subject to any disclaimer, the term of this patent is extended or adjusted under 35 U.S.C. 154(b) by 22 days.

(21) Appl. No.: 10/401,809

(22) Filed: Mar. 28, 2003

(65) Prior Publication Data
US 2003/0184088 A1    Oct. 2, 2003

(30) Foreign Application Priority Data
Mar. 29, 2002    (JP) ............... 2002-096604

(51) Int. Cl.
*F16L 37/00*    (2006.01)

(52) U.S. Cl. ............. 285/319; 285/305; 285/351; 285/921

(58) Field of Classification Search ........ 285/319, 285/305, 351, 921
See application file for complete search history.

(56) References Cited

U.S. PATENT DOCUMENTS

| | | | |
|---|---|---|---|
| 4,679,825 A * | 7/1987 | Taylor ........................ 285/93 |
| 4,750,765 A * | 6/1988 | Cassidy et al. ............ 285/321 |
| 4,875,709 A * | 10/1989 | Caroll et al. ................. 285/14 |
| 5,044,675 A | 9/1991 | Sauer |
| 5,087,084 A | 2/1992 | Gehring |
| 5,098,136 A | 3/1992 | Washizu |
| 5,131,691 A | 7/1992 | Washizu |
| 5,154,450 A | 10/1992 | Washizu |
| 5,275,443 A * | 1/1994 | Klinger ....................... 285/82 |
| 5,354,106 A | 10/1994 | Washizu |
| 5,374,088 A * | 12/1994 | Moretti et al. ............ 285/305 |
| 5,468,030 A * | 11/1995 | Walling ...................... 285/364 |
| 5,518,276 A * | 5/1996 | Gunderson .................. 285/93 |
| 5,607,190 A | 3/1997 | Exandier et al. |
| 5,779,286 A * | 7/1998 | Kaishio ..................... 285/379 |
| 5,785,358 A | 7/1998 | Kujawski et al. |
| 5,823,508 A | 10/1998 | Nie |
| 5,882,048 A * | 3/1999 | Kawasaki et al. ......... 285/319 |
| 6,152,496 A * | 11/2000 | Kouda ....................... 285/316 |
| 6,158,783 A * | 12/2000 | Johnson .................... 285/205 |
| 6,173,998 B1 | 1/2001 | Bock |
| 6,345,844 B1 * | 2/2002 | Miyajima et al. ............ 285/39 |
| 6,517,118 B1 * | 2/2003 | Kato et al. ............... 285/222.1 |
| 6,517,120 B1 | 2/2003 | Miyajima et al. |

(Continued)

FOREIGN PATENT DOCUMENTS

GB    2233726 A  *  1/1991

(Continued)

OTHER PUBLICATIONS

Publication of JP, U, 5-12889.

(Continued)

*Primary Examiner*—James M. Hewitt
(74) *Attorney, Agent, or Firm*—Andrus, Sceales, Starke & Sawall, LLP

(57) ABSTRACT

An inner peripheral surface of a tube connecting portion of a tubular connector housing is divided into a first receiving portion on one axial side and a second receiving portion on an opposite axial side by an inwardly directed annular parting projection. A first O-ring of one axial side and a second O-ring of an opposite axial side are disposed with intervening a collar therebetween on an opposite axial side in the first receiving portion. The first O-ring is made of FKM and the second O-ring is made of FVMQ. A third O-ring is disposed on one axial side in the second receiving portion. The third O-ring is also made of FVMQ.

15 Claims, 12 Drawing Sheets

U.S. PATENT DOCUMENTS

| | | | |
|---|---|---|---|
| 6,637,780 B1 | 10/2003 | Miyajima et al. | |
| 2002/0084654 A1* | 7/2002 | Katayama et al. | 285/423 |
| 2002/0140225 A1* | 10/2002 | Nishiyama et al. | 285/222.1 |
| 2002/0145283 A1 | 10/2002 | Miyajima et al. | |
| 2002/0145285 A1* | 10/2002 | Katayama et al. | 285/423 |
| 2003/0047942 A1* | 3/2003 | Yasuda et al. | 285/252 |

FOREIGN PATENT DOCUMENTS

| | | |
|---|---|---|
| GB | 2292433 | 2/1996 |

OTHER PUBLICATIONS

Publication of JP 2001-141158.
Publication of JP 2002-54780.
Publication of JP 2002-122281.
Publication of JP 2002-327883.
Publication of JP 08-210576.

* cited by examiner

QUICK CONNECTOR

BACKGROUND OF THE INVENTION

The present invention relates to a quick connector to be adapted for assembly in a fuel piping, for example, a fuel piping of an automobile, and more specifically, to sealing means to provide a seal between a pipe and a connector housing.

In a gasoline fuel piping structure, for example, a gasoline fuel piping structure of an automobile, a quick connector (A) as shown in FIG. 11 is used for joining a tube to a pipe. The quick connector (A) has a tubular connector housing (B) and a retainer (C) fitted in the tubular connector housing (B). The tubular connector housing (B) is provided with a tube connecting portion (D) on one axial end thereof and a pipe inserting portion (E) on an opposite axial end thereof, and the pipe inserting portion (E) has an projection receiving portion (F) on an opposite axial end thereof wherein the retainer (C) is fitted. A pipe is relatively inserted into an insertion opening on an end of the tubular connector housing (B), the pipe inserting portion (E) or the projection receiving portion (F) so as to snap-fit in the quick connector (A), and thereby the quick connector (A) is connected to the pipe. As shown in FIG. 12, a pipe (G) to be connected to the quick connector (A) is formed with an inserting end portion (H) on one axial end thereof, and the inserting end portion (H) of the pipe (G) is provided with an annular engagement projection (I) on an outer peripheral surface thereof. The inserting end portion (H) of the pipe (G) is inserted in the pipe inserting portion (E) of the tubular connector housing (B), the annular engagement projection (I) snap-engages with the retainer (C), and thereby the pipe (G) snap-fits in the quick connector (A).

The pipe inserting portion (E) has a seal holding portion (J) which is formed smaller in diameter than the projection receiving portion (F) on one axial end of the projection receiving portion (F). Sealing means (K) is disposed in the seal holding portion (J) on one axial end thereof to provide a seal between the pipe inserting portion (E) and the inserting end portion (H) of the pipe (G). The sealing means (K) comprises annular sealing member (L) made of elastic material, which prevents gasoline from leaking out between the tubular connector housing (B) and the pipe (G).

Meanwhile, an annular sealing member (L) adapted to the sealing means (K) is preferably made of elastic materials of gasoline resistant property to deal with environmental problems by reducing the amount of gasoline fuel permeation from the quick connector (A), or to prevent the annular sealing member (L) from swelling due to contact with gasoline and thereby losing elasticity. On the other hand, for the sealing means (K), low-temperature resistant properties are required in order to prevent the sealing property of the sealing means (K) from decreasing in cold temperature, for example, in an automobile used in cold climate regions, and thereby gasoline from leaking out. Then, a technical construction is employed wherein the sealing means (K) is constructed by two annular sealing members (L), (L) disposed axially in side by side relation as shown specifically in FIGS. 11 and 12. The annular sealing member (L) of one axial end, which is in contact directly with gasoline, is a material having gasoline resistant property, and the annular sealing member (L) of an opposite axial end is a material having low-temperature resistant property, so that the sealing means (K) is provided with both high gasoline resistant property and low-temperature resistant property.

However, in case that the quick connector (A) is disposed upright or in a direction longitudinally thereof, with an insertion opening upward and the tube connecting portion (D) downward, or in case that a large engagement window (M) to be engaged with the retainer (C) is provided on the projection receiving portion (F) of the connector housing (B) as specifically shown in FIGS. 11 and 12, a relatively large amount of water and dust are likely to migrate between the connector housing (B) and the pipe (G). If the water remains in contact with the pipe (G) between the connector housing (B) and the pipe (G), it eventually causes corrosion on the pipe (G) connected with the quick connector (A). And, if a relatively large amount of water and dust migrate between the connector housing (B) and the pipe (G), there is also a fear that a considerable amount of water and dust penetrate along up to the annular sealing member (L) of an opposite axial end. In a state where a considerable amount of water and dust have penetrated up to the annular sealing member (L) of an opposite axial end, if vibration is exerted on the quick connector (A) or the inserting end portion (H) of the pipe (G), and thereby slight relative sliding movement and/or slight relative rotational movement occur repeatedly between the connector housing (B) and the pipe (G), for example, due to gasoline fuel piping connected to vibration source such as a gasoline engine, the annular sealing member (L) of an opposite axial end is eventually worn off and deteriorated. In case that the annular sealing member (L) of an opposite axial end is deteriorated, if elasticity of the annular sealing member (L) of one axial end is lowered, for example, in cold climate regions, the sealing means (K) eventually loses sufficient sealing function against gasoline fuel.

SUMMARY OF THE INVENTION

Accordingly, it is an object of the present invention to provide a quick connector including sealing means which has an excellent or high gasoline fuel resistant property and does not lose sufficient sealing property against gasoline fuel constantly.

In order to achieve the foregoing object, there is provided a novel quick connector for the gasoline fuel path to be connected with a pipe which includes an inserting end portion provided with an annular engagement projection, for example, on one axial end thereof.

The quick connector has a tubular connector housing which is provided with a tube connecting portion on one axial end thereof and a projection receiving portion to receive the annular engagement projection of the pipe on an opposite axial end thereof. The quick connector also has retainer means provided for the projection receiving portion and configured so as to snap-engage with the annular engagement projection of the pipe when the inserting end portion of the pipe is inserted into an insertion opening on an end of the projection receiving portion. The quick connector further has sealing means disposed on one axial end of the projection receiving portion in the tubular connector housing, for example, on one axial end of an inside of the projection receiving portion in the tubular connector housing to provide a seal between the tubular connector housing and one axial end or end portion of the annular engagement projection of the inserting end portion provided on the pipe. The sealing means includes a first annular sealing member of gasoline fuel resistant property and a third annular sealing member of low-temperature resistant property located on an opposite axial end of the first annular sealing member in the tubular connector housing. The sealing means further includes a second annular sealing member for waterproofness and dust proofness located on an opposite axial end of the third annular sealing member in the tubular connector housing. The second annular sealing member has waterproof and dust proof functions with respect to the third annular sealing member. That is, the second annular sealing member prevents water and dust from penetrating into an end of the third annular sealing member. Therefore, deterioration of the third annular sealing member is prevented and thereby the sealing means is improved in low-temperature resistant property.

The tubular connector housing may be made of resin or metal. A retainer, which is configured to be fitted in the projection receiving portion of the tubular connector housing, may be adapted for retainer means. The retainer is fitted in the projection receiving portion of the tubular connector housing, for example, by engaging with a pair of engagement windows which are formed on the projection receiving portion. An engagement slit may be formed on one axial end portion of the retainer. The annular engagement projection of the pipe snap-engages in the engagement slit, and thereby connection is completed between the pipe and the connector. A retainer, which is configured to be fitted on an outer peripheral surface of the projection receiving portion of the tubular connector housing so as to embrace therearound, also may be adapted for retainer means. The retainer may be formed generally in C-shape or horse-shoe shape and provided with a pair of leg portions, for example, in wire retainer or wire clip type retainer. The retainer is fitted on an outer peripheral surface of the projection receiving portion of the tubular connector housing with the leg portions seated in a pair of engagement windows formed like slit on the projection receiving portion, or in any other manner. The leg portions of the retainer may project inside of the projection receiving portion through the engagement windows or the slit-like windows on the projection receiving portion. Here, the leg portions or inwardly directed engagement portions which are formed on ends of the leg portions snap-engage with the annular engagement projection of the pipe, and thereby connection has been completed between the pipe and the quick connector.

The second annular sealing member is typically located on the outermost end of the sealing means, and is exposed to air. Therefore, the second annular sealing member is more preferably made of an elastic material having ozone resistant property as well as waterproof and dust proof properties.

Specifically, the first annular sealing member may be made of fluorine type rubber or of NBR type rubber of excellent gasoline resistant property, and the third annular sealing member may be made of silicone type rubber, NBR type rubber, ethylene-propylene-diene terpolymer or flexible polyolefine type thermoplastic resin. And, the second sealing member may be made of fluorine type rubber, NBR type rubber, silicone type rubber, ethylene-propylene-diene terpolymer or flexible polyolefine type thermoplastic resin. More specifically, the first sealing member may be made of an elastic material of gasoline resistant property, selected from the group consisting of fluoro-rubber (FKM) and acrylonitrile-butadiene rubber/polyvinyl chloride blend rubber (NBR/PVC). The third annular sealing member may be made of an elastic material of low-temperature resistant property or low-temperature property, selected from the group consisting of fluoro-silicone-rubber (FVMQ), acrylonitrile-butadiene rubber (NBR), NBR/PVC, ethylene-propylene-diene-rubber (EPDM) and thermoplastic olefin (TPO). And, the second annular sealing member may be made of NBR of excellent waterproof and dust proof properties, or of an elastic material of ozone resistant property as well as waterproof and dust proof properties, selected from the group consisting of FKM, NBR/PVC, FVMQ, EPDM and TPO. Table 1 indicates properties of each material. FKM is relatively expensive and inferior in low-temperature resistant property, but is very excellent or superior in gasoline resistant property and ozone resistant property, and therefore suitable for the first and the second annular sealing members. NBR/PVC has ozone resistant property, and excellent gasoline resistant property although not so much as FKM. NBR/PVC further has excellent low-temperature resistant property although not so much as FVMQ, and is relatively low at cost. Therefore, NBR/PVC is suitable for the first to the second annular sealing members. Moreover, FVMQ is expensive, but has very excellent low-temperature resistant property and very excellent ozone resistant property, and therefore is suitable for the third and the second annular sealing members. On the other hand, NBR is relatively low in cost, and has excellent low-temperature resistant property although not so much as FVMQ, and further has waterproof and dust proof properties. So, NBR is suitable for the third and the second annular sealing members. Fluorine type rubber, NBR/PVC, silicone type rubber, EPDM and TPO, which are all excellent in ozone resistant property, are suitable for the second annular sealing member as stated above.

TABLE 1

| Material | Type | Gasoline resistant property | Low temperature resistance | Ozone resistance | Water proofness/ dust proofness |
|---|---|---|---|---|---|
| FKM (fluoro-rubber) | Fluorine type rubber | ⊚ | × | ⊚ | ○ |
| NBR (acrylonitrile-butadiene rubber) | NBR type rubber | Δ | ○ | × | ○ |
| NBR/PVC (NBR + polyvinyl chloride blend rubber) | NBR type rubber | ○ | ○ | ○ | ○ |
| FVMQ (fluoro-silicone-rubber) | silicone type rubber | ○~× | ⊚ | ⊚ | ○ |
| EPDM (ethylene-propylene-diene-rubber) | terpolymer rubber | × | ⊚ | ○ | ○ |
| TPO (thermoplastic olefine) | polyolefine type thermoplastic resin | × | ○ | ○ | ○ |

⊚ Superior
○ Excellent
Δ Average
× Inferior

In many cases, a resin-bush is fitted in the tubular connector housing to position axially the sealing means therein. Typically, an inner diameter of the resin-bush is dimensioned generally identical to an outer diameter of the inserting end portion of the pipe, and the sealing means is provided or disposed in an inner peripheral surface of the tubular connector housing so as to be located on one axial end of the resin-bush. However, if the quick connector is formed small-sized or a portion of the tubular connector housing is formed with short axial length where the sealing means and the resin-bush are disposed, room with sufficient axial length cannot be afforded to accommodate the first to the second annular sealing members in properly axially spaced relation with one another on one axial end of the resin-bush. In this case, preferably the second annular sealing member is disposed in the resin-bush. In order to dispose the second annular sealing member in the resin-bush, a seal fitting annular groove may be formed in the resin-bush, for example, made of polyamide (PA, nylon) and then the second annular sealing member may be fitted and maintained in an axial position in the annular groove. However, in view of efficiency in quick connector assembly work, it is advantageous that the second annular sealing member made of TPO or other materials is formed integrally in the resin-bush made of polypropylene (PP) or other materials beforehand, for example, by two-color injection molding or two-shot molding.

A quick connector of the present invention is provided with an annular sealing member for waterproofness and dust proofness which is located on an opposite axial end of an annular sealing member of excellent or preferable gasoline resistant property, i.e., excellent or preferable gasoline fuel impermeability and/or swelling resistant property and an annular sealing member of low-temperature resistant property. Consequently, the quick connector of the present invention is high in gasoline resistant property and, in addition, keeps preferable low-temperature resistant property constantly.

Now, the preferred embodiments of the present invention will be described in detail with reference to the drawings.

DETAILED DESCRIPTION OF THE PREFERRED EMBODIMENTS

Figure 1:
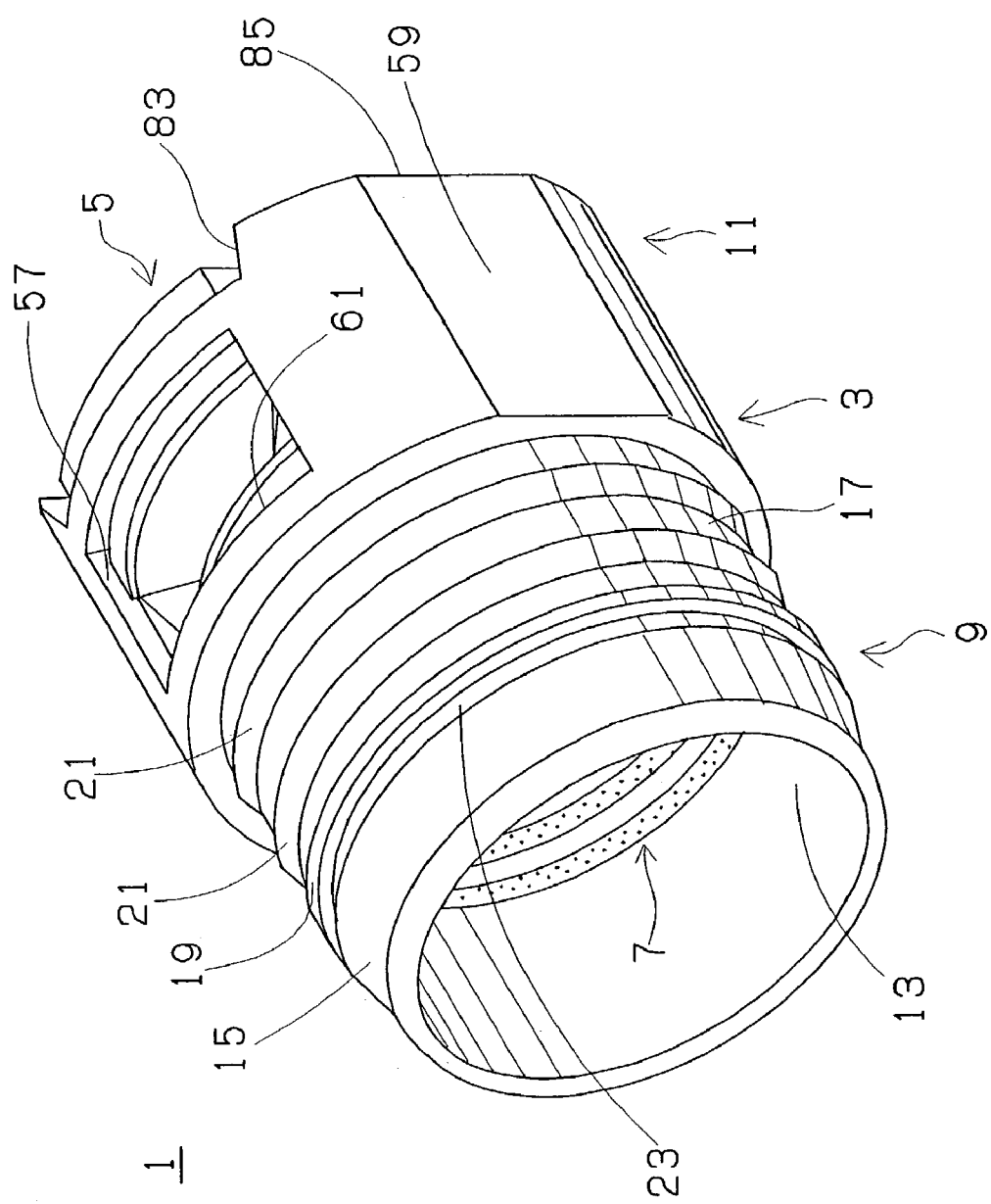
FIG. 1 is a perspective view of a quick connector according to the present invention.

A quick connector 1, which is adapted for assembly for a gasoline fuel piping of an automobile, as shown in FIG. 1, comprises a tubular connector housing 3, a generally annular retainer 5 and sealing means 7. The tubular connector housing 3 made of glass fiber reinforced polyamide (PA•GF), integrally has a cylindrical resin tube connecting portion 9 on one axial end thereof and a generally cylindrical projection receiving portion 11 on an opposite axial end thereof, and is provided with a through-bore 13 through from one axial end to an opposite axial end thereof. The resin tube connecting portion 9 has one axial end portion 15 like right triangle in cross-section having an outer peripheral surface expanding gently in diameter toward an opposite axial end of the resin tube connecting portion 9, and an opposite axial end portion 17 having an outer peripheral surface extending like a simple cylindrical shape on an opposite axial end of the one axial end portion 15 of the resin tube connecting portion 9. The opposite axial end portion 17 is provided on the outer peripheral surface with an annular projecting stop portion 19 like rectangular in cross-section and two annular projecting stop portions 21, 21 like right triangle in cross-section expanding in diameter toward an opposite axial end thereof. The annular projecting stop portion 19 and the annular projecting stop portions 21, 21 are arranged in axially spaced relation sequentially from one axial end to an opposite axial end of the opposite axial end portion 17. A resin tube, for example, a resin pipe member is tightly fitted on and connected to an outer periphery or an outer peripheral surface of the resin tube connecting portion 9. A rubber hose or a SUS pipe is also adapted for a member to be connected with a tube connecting portion of a quick connector of the present invention. An outer peripheral surface 23 on one axial end portion of the opposite axial end portion 17, namely a portion between the one axial end portion 15 and the annular projecting stop portion 19 is formed in small diameter or in deep annular groove. Prior to fitting of a resin tube to the quick connector 1, at least one annular sealing member (not shown) is fitted on the outer peripheral surface 23.

Figure 2:
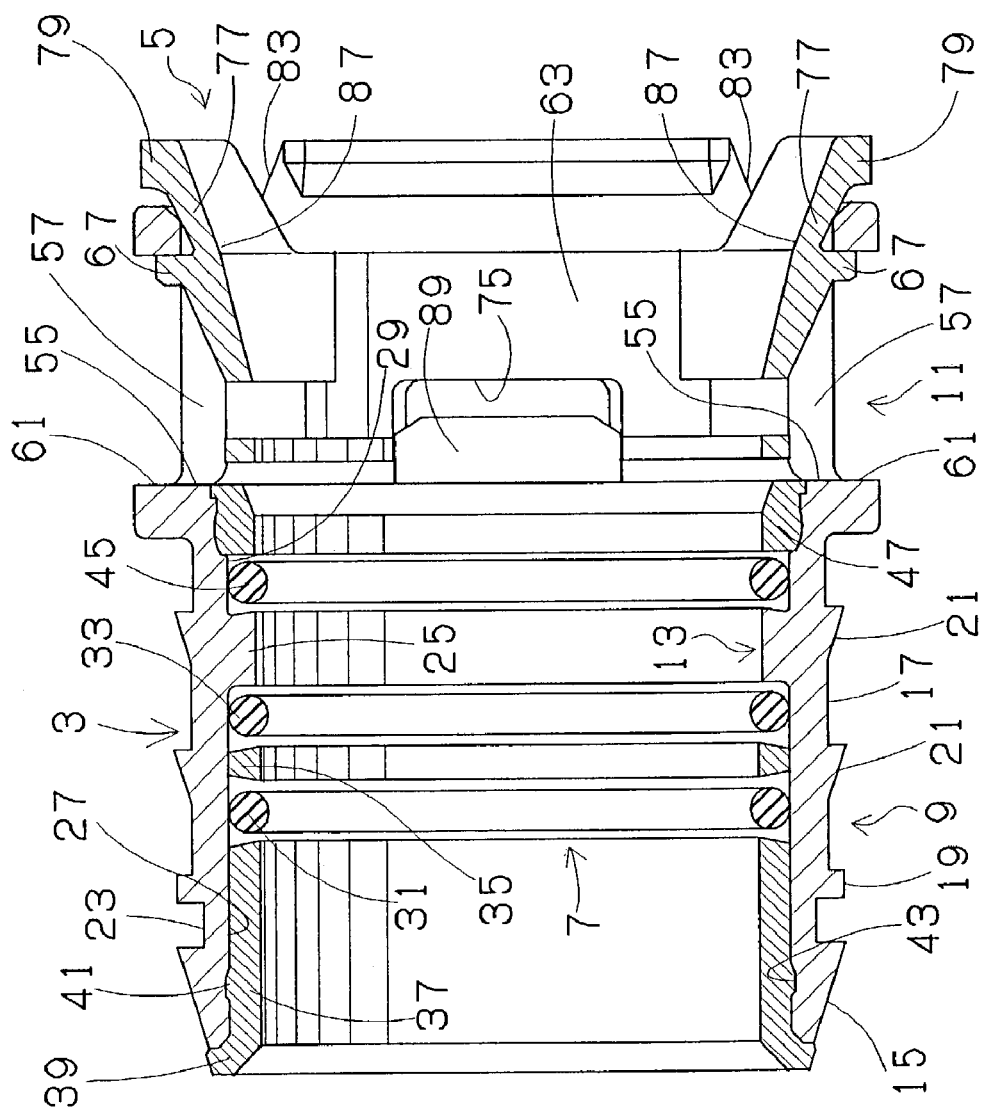
FIG. 2 is a cross-sectional view of the quick connector according to the present invention.

As well shown in FIG. 2, an inner peripheral surface on one axial end of the projection receiving portion 11 or inside of the projection receiving portion 11 of the tubular connector housing 3, or an inner peripheral surface of the tube connecting portion 9 is formed with an inwardly directed annular parting projection 25 near an opposite axial end thereof, and is divided by the inwardly directed annular parting projection 25 into a first receiving portion 27 on one axial end and a second receiving portion 29 on an opposite axial end thereof. In the first receiving portion 27, a first O-ring (first annular sealing member) 31 of one axial end and a third O-ring (third annular sealing member) 33 of an opposite axial end are fitted with intervening a collar 35 therebetween, namely in axially spaced relation with one another on an opposite axial end thereof, and a first resin bush 37 is fitted on one axial end thereof. The first resin bush 37 is formed generally in a cylindrical shape, and provided integrally with an annular engagement portion 39 on one axial end portion thereof. The annular engagement portion 39 is formed so as to project somewhat radially outwardly. The first resin bush 37 is provided with a low annular projecting portion 41 on an outer peripheral surface near one axial end thereof, and has an inner diameter substantially identical to an inner diameter of the inwardly directed annular parting projection 25. However, the annular engagement portion 39 has an inner peripheral surface expanding in diameter toward one axial end thereof. Thus configured first resin bush 37 is fitted in the first receiving portion 27 so that the annular projecting portion 41 seats in a shallow annular groove 43 formed near one axial end of the first receiving portion 27 and an outer peripheral surface of an opposite axial end of the annular engagement portion 39 engages with one axial end portion of the tube connecting portion 9 or the one axial end portion 15. An outer peripheral surface of one axial end of the annular engagement portion 39 is located so as to be substantially continued from an outer peripheral surface of the one axial end portion 15, just like an tapered outer peripheral surface of the one axial end portion 15 extended in one axial direction. The first O-ring 31 and the third O-ring 33 are maintained in an axial position, between the inwardly directed annular parting projection 25 and the first resin bush 37.

The first O-ring 31 is made of FKM. The third O-ring 33 is made of FVMQ of superior or very excellent low-temperature resistant property. The first O-ring 31 may be also made of NBR/PVC. And, the third O-ring 33 may be also made of NBR type rubber, EPDM or TPO.

Figure 4:
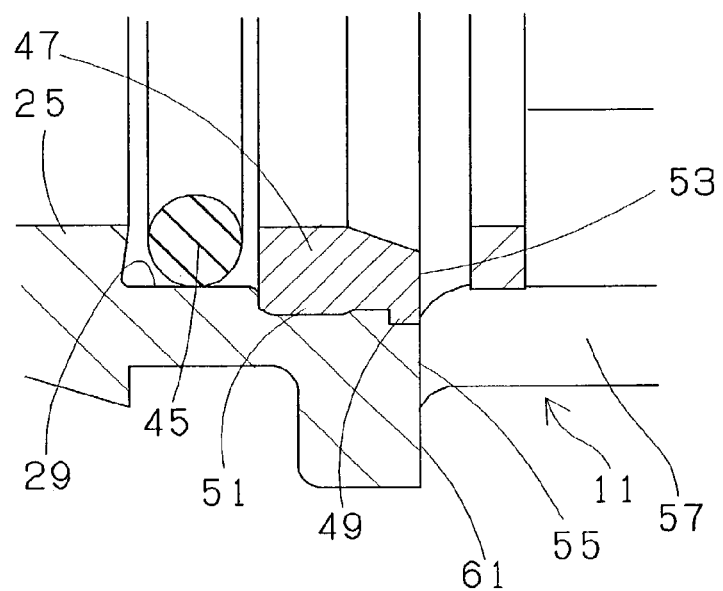
FIG. 4 is an enlarged view of a periphery of a second resin bush of the quick connector according to the present invention.

As well shown in FIG. 4, in the second receiving portion 29, a second O-ring (second annular sealing member) 45 is fitted on one axial end, and a second resin bush 47 of annular shape is fitted on an opposite axial end of the second receiving portion 29. The second resin bush 47 integrally has a flange 49 projecting somewhat radially outwardly on an opposite axial end portion thereof, and is provided with an annular projecting portion 51 swelling somewhat radially outwardly on an outer peripheral surface of one axial end thereof. An inner peripheral surface of the second resin bush 47 has an opposite axial end surface portion expanding in diameter toward an opposite axial end or in an opposite axial direction and one axial end surface portion extending like a short cylindrical shape with an inner diameter generally identical to an inner diameter of the inwardly directed annular parting projection 25. An opposite axial end portion of the second receiving portion 29 is formed somewhat large in diameter and corresponds to an outer peripheral surface of the second resin bush 47 in shape. The second resin bush 47 is fitted in an opposite axial end portion of the second receiving portion 29 so that an annular end surface 53 on an opposite axial end thereof is located to share a plane common with an annular abutment surface or an annular inside end surface 55 formed on one axial end of inner side of the projection receiving portion 11 with narrow width extending radially inwardly. The second O-ring 45 is maintained in an axial position, between the inwardly directed annular parting projection 25 and the second resin bush 47. As an opposite axial end surface of the inwardly directed annular parting projection 25 is formed toward radially outwardly inclining in one axial direction so as to provide a room as escapeway for the second O-ring 45 which is axially swollen when pressed by a pipe. With adapting thus configured sealing structure, it is effectively prevented that the second O-ring 45 is unacceptably deformed at insertion of a pipe, although the second O-ring 45 is formed relatively in large diameter, and is apt to be deformed.

The second O-ring 45 is made of FVMQ. FVMQ is very excellent in ozone resistant property and in low-temperature resistant property. FVMQ where fluorine content is adjusted has also gasoline resistant property. The second O-ring 45 may be made of FKM, NBR type rubber, EPDM or TPO as well.

The first O-ring 31, the third O-ring 33 and the second O-ring 45 construct sealing means 7. In this sealing means 7, an axial space generally corresponding to thickness of the collar 35 is secured between the first O-ring 31 and the third O-ring 33, while an axial space generally corresponding to thickness of the inwardly directed annular parting projection 25 is secured between the third O-ring 33 and the second O-ring 45. The collar 35 is thinner than the inwardly directed annular parting projection 25, specifically, generally of one-half thickness of the inwardly directed annular parting projection 25. Therefore, the axial space secured between the first O-ring 31 and the third O-ring 33 is shorter than the axial space secured between the third O-ring 33 and the second O-ring 45, specifically, generally of one-half length of the axial space between the third O-ring 33 and the second O-ring 45.

The generally cylindrical projection receiving portion 11 of larger diameter than the resin tube connecting portion 9, is provided with engagement windows 57, 57 in diametrically symmetrical positions and in opposed relation with one another, and flat regions 59, 59 (only one flat region 59 is shown) on the outer peripheral surfaces respectively between the engagement windows 57, 57. One axial ends or one axial end surfaces 61, 61 of the engagement windows 57, 57 are located to share a plane common with the annular abutment surface 55 of inner side of the projection receiving portion 11 and the annular end surface 53 of an opposite axial end of the second resin bush 47. That is, no step is defined on a surface between the one axial end 61 of the engagement window 57 and an edge of an opening of an opposite axial end of the second resin bush 47 or the annular end surface 53 of the second resin bush 47, and this configuration hardly permits water to remain there. Thereby such inconvenience is eliminated as water remains in a gap defined between a step and a metallic pipe connected resulting that the pipe is rusted and corroded. When a checker for verifying complete connection with a pipe is adapted, typically, engagement portions of the checker engage with the engagement windows 57, 57.

Figure 3:
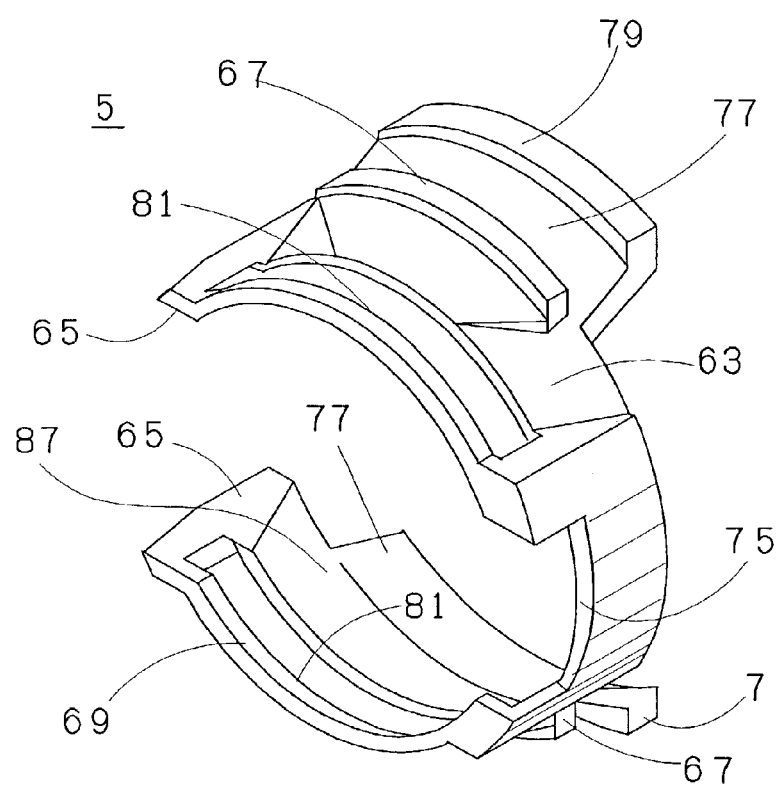
FIG. 3 is a perspective view of a retainer adapted to the quick connector according to the present invention.

The retainer 5 made of PA is fitted in the projection receiving portion 11. This retainer 5 is relatively flexible, and is formed so as to be resiliently deformable. As well shown in FIG. 3, the retainer 5 has a main body 63 of C-shape in cross-section, namely generally annular shape wherein a relatively large space for deformation is defined between circumferential opposite ends 65, 65 thereof. The main body 63 is provided with a pair of engagement tabs 67, 67 projecting radially outwardly in diametrically symmetrical positions of an opposite axial end portion thereof. An inner surface of the main body 63, except a portion diametrically opposed to the space for deformation, is tapered so as to reduce gradually an inner diameter toward one axial end or in one axial direction. And, apart from the portion diametrically opposed to the space for deformation, one axial end portion 69 of the main body 63 is formed with an inner diameter almost identical to a pipe (refer to a reference numeral 71 in FIG. 5), and smaller than an annular engagement projection (refer to a reference numeral 73 in FIG. 5). The portion diametrically opposed to the space for deformation of the main body 63 has an inner surface shaped like a part of a cylindrical inner surface, and is formed with a notched portion 75 on one axial end portion 69 thereof.

A pair of short operation arms 77, 77 are formed integrally on an opposite axial end portion of the main body 63 of the retainer 5 so as to extend inclining radially outwardly in an opposite axial direction from respective circumferential positions corresponding to the engagement tabs 67, 67. The operation arms 77, 77 respectively has a latching end 79 projecting radially outwardly on an opposite axial end portion thereof. The one axial end portion 69 of the main body 63 is provided with engagement slits 81, 81 extending circumferentially in opposed relation with one another. Thus configured retainer 5 is inserted and fitted in the projection receiving portion 11 so that the engagement tabs 67, 67 seat in the engagement windows 57, 57 of the projection receiving portion 11 and the latching ends 79, 79 fit in recessed receiving portions 83, 83 of the projection receiving portion 11 in engagement relation therewith respectively. The recessed receiving portions 83, 83 are formed in diametrically symmetrical positions of the opposite axial end portion 85 of the projection receiving portion 11 respectively. As the latching end 79 of the operation arm 77 is received in thus arranged recessed receiving portion 83, it is prevented that the retainer 5 moves from its correct fit-in position in the projection receiving portion 11, when the latching end 79 is just touched carelessly by an operator. The recessed receiving portions 83, 83 have circumferential opposite ends widening in an opposite axial direction. Opposed inner surface 87, 87 of the retainer 5 in arcuate cross-section which extend from the operation arms 77, 77 to the engagement slits 81, 81 are generally tapered respectively in one axial direction toward the center or the central axis of the retainer 5. And then the retainer 5 is configured so that the annular engagement projection 73 of the pipe 71 necessarily or substantially necessarily abuts the tapered inner surfaces 87, 87 of the retainer 5 at boundaries between the operation arms 77, 77 and the main body 63 when the pipe 71 is inserted in the main body 63 of the retainer 5 through the end of the latching ends 79, 79 of the operation arms 77, 77. Reference numeral 89 in FIG. 2 indicates an anti-rotation raised portion is formed integrally on an inner peripheral surface of the projection receiving potion 11 and fits in the notched portion 75 of the main body 63 of the retainer 5 to restrain rotational movement with respect to the retainer 5.

Figure 5:
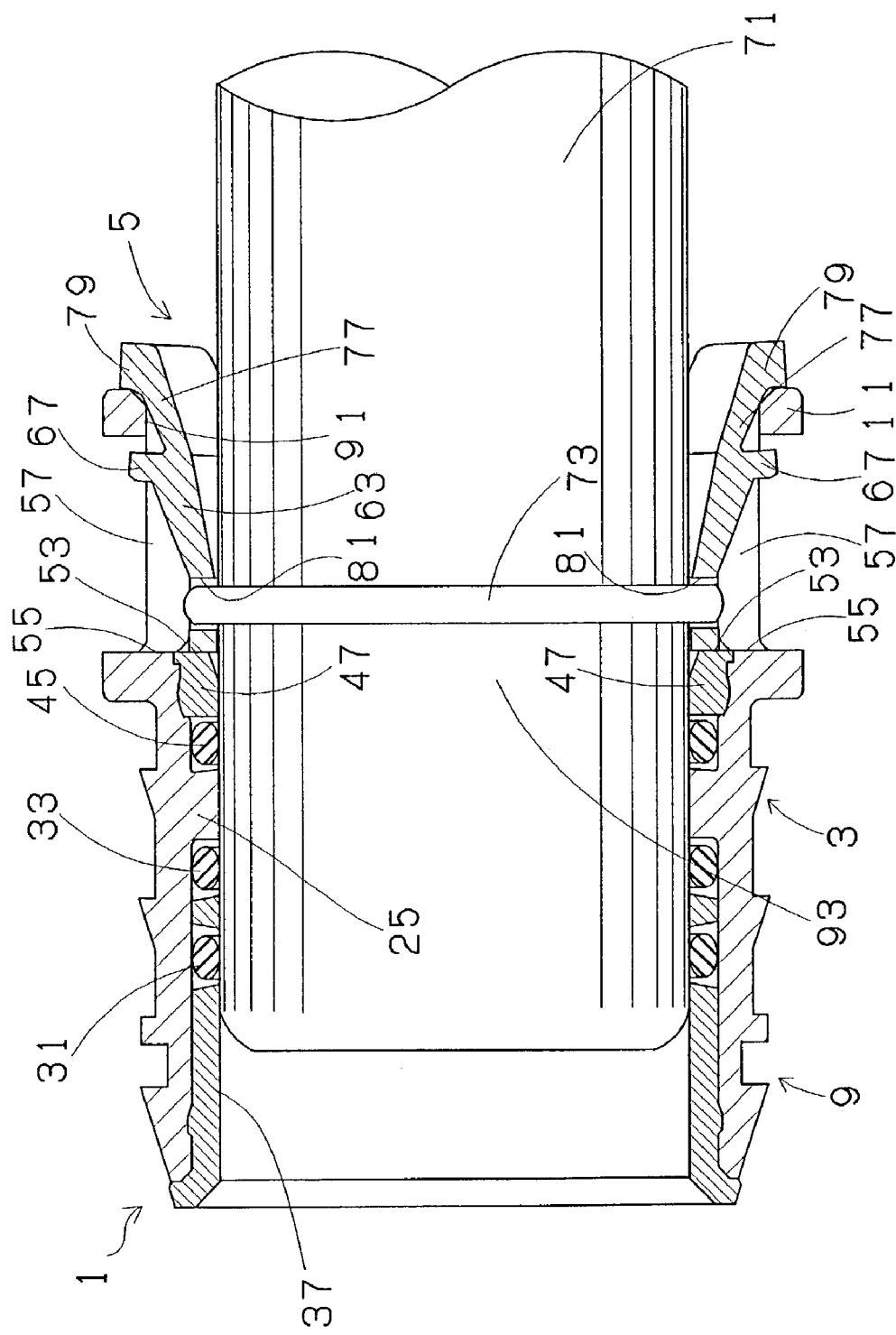
FIG. 5 is a cross-sectional view of the quick connector according to the present invention wherein a pipe is connected.

As shown in FIG. 5, the pipe 71 to be joined with the tube, made of metal is inserted into an insertion opening 91 on an end of the projection receiving portion 11, more specifically, in the main body 63 of the retainer 5 through the end of the latching ends 79, 79 of the operation arms 77, 77, and is to be fitted in the quick connector 1. The pipe 71 has an inserting end portion 93 on one axial end wherein the annular engagement projection 73 is formed on an outer peripheral surface. The pipe 71 is pushed, and fittingly inserted into the quick connector 1 or the tubular connector housing 3 so that the annular engagement projection 73 progresses radially expanding an inner surface of the main body 63 of the retainer 5 until the annular engagement projection 73 seats in the engagement slits 81, 81 in snap-engagement relation therewith. The annular engagement projection 73 which seats and snap-engages in the engagement slits 81, 81 of the main body 63 of the retainer 5 blocks or limits further axial in-and-out movement of the pipe 71 with respect to the quick connector 1. That is, the pipe 71 is thereby almost locked against relative axial movement in the quick connector 1. One axial end or an inserting end of the pipe 71 reaches in the first resin bush 37 fitted in the resin tube connecting portion 9 through the second O-ring 45, the third O-ring 33 and the first O-ring 31, and thereby a seal is formed by the first 31, third 33 and second 45 O-rings between an outer peripheral surface of the pipe 71 and an inner peripheral surface of the quick connector 1, more specifically, between an outer peripheral surface of one axial end of the annular engagement projection 73 of the inserting end portion 93 of the pipe 71 and an inner peripheral surface of the tube connecting portion 9. One axial end of the annular engagement projection 73 of the inserting end portion 93 of the pipe 71 is fittingly inserted without play in the second resin bush 47, the inwardly directed annular parting projection 25 and the first resin bush 37 having inner diameters generally identical to an outer diameter of the pipe inserting portion 93 of the pipe 71. The retainer 5 is usually fitted slightly loosely in the projection receiving portion 11 with slight axial play therein. However, at least when the pipe 71 is fully inserted therein, one axial end of the main body 63 is in abutment relation relative to the annular abutment surface 55 and the annular end surface 53 of an opposite axial end of the second resin bush 47.

In the event of removing the pipe 71 from the quick connector 1, the latching ends 79, 79 of the operation arms 77, 77 received in the recessed receiving portions 83, 83 are pressed radially inwardly from outside to narrow a radial space between the operation arms 77, 77, thus a radial space between the engagement tabs 67, 67. And, thereby the engagement tabs 67, 67 are out of the engagement windows 57, 57, and the retainer 5 can be relatively pulled out of the tubular connector housing 3. As the retainer 5 is relatively pulled out of the tubular connector housing 3, the pipe 71 is also pulled out of the quick connector 1 or the tubular connector housing 3 along with the retainer 5.

Figure 6:
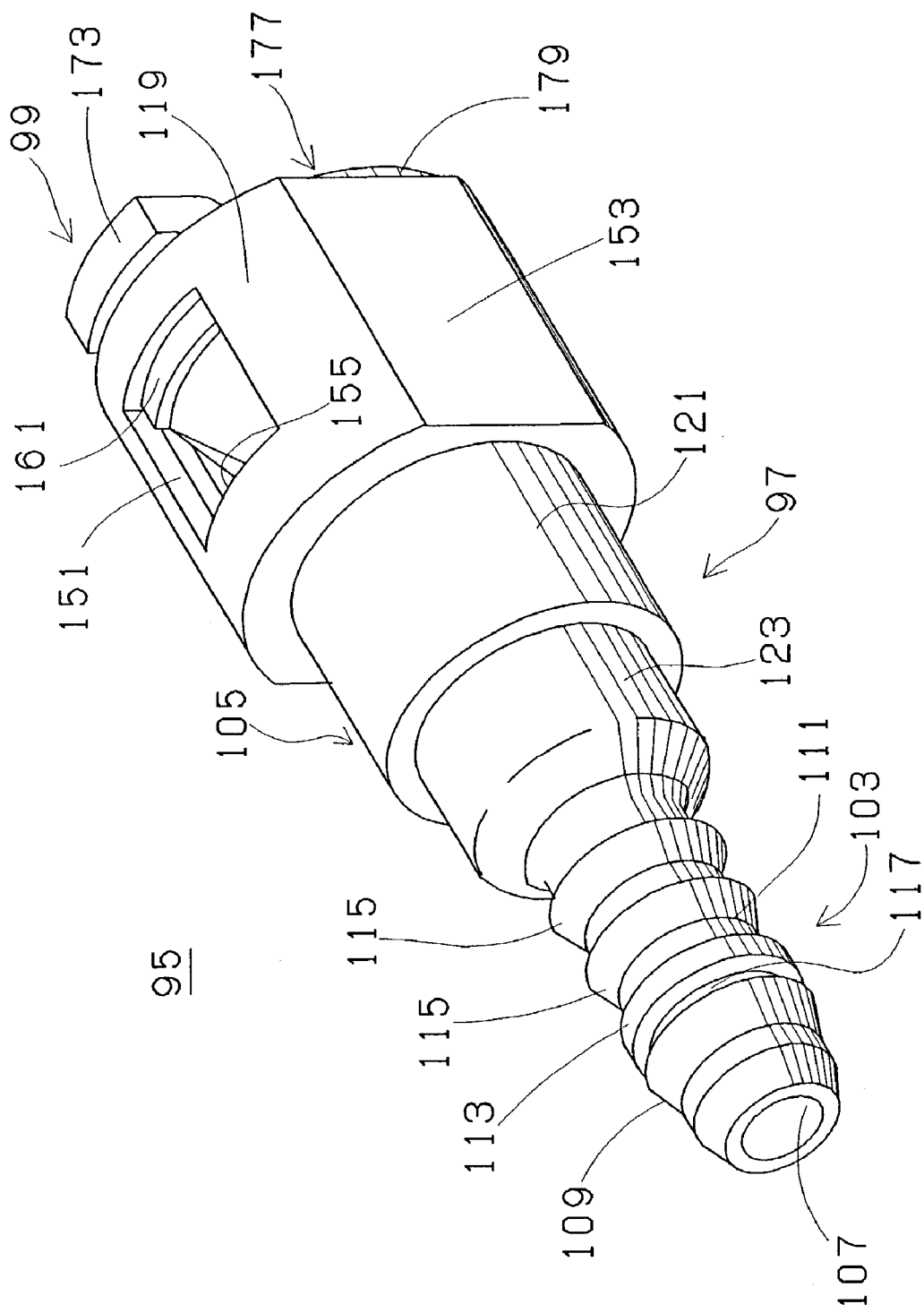
FIG. 6 is a perspective view of a quick connector of another configuration according to the present invention.
Figure 7:
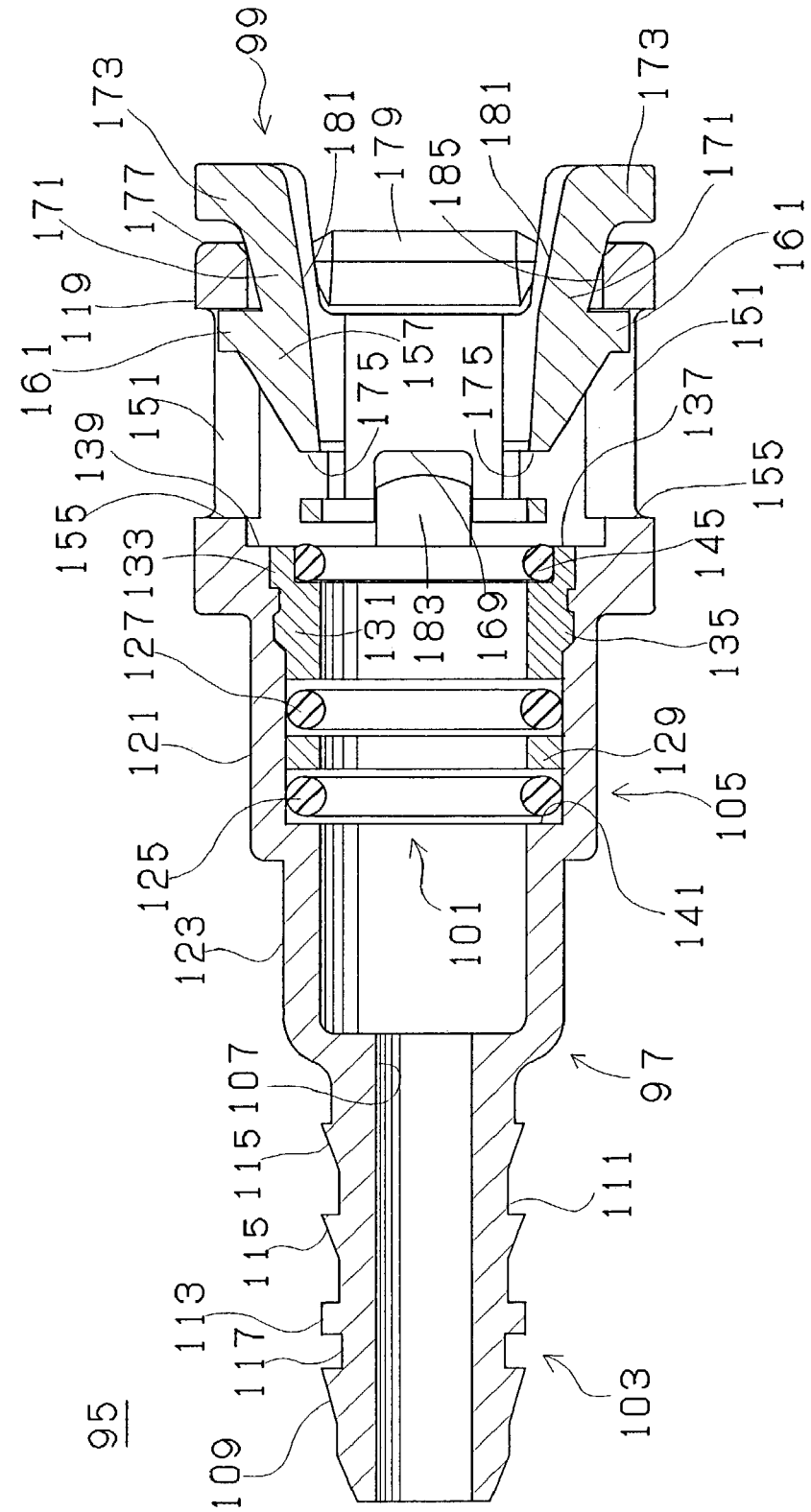
FIG. 7 is a cross-sectional view of the quick connector of another configuration according to the present invention.

FIGS. 6 and 7 show a quick connector 95 of another configuration. The quick connector 95 of another configuration, which is also adapted for assembly in a gasoline fuel piping of an automobile, comprises a tubular connector housing 97, a generally annular retainer 99 and sealing means 101 just like the quick connector 1, but is formed small-sized or smaller in diameter than the quick connector 1. The tubular connector housing 97 made of PA• GF, integrally has a cylindrical resin tube connecting portion 103 on one axial end thereof and a generally cylindrical pipe inserting portion 105 on an opposite axial end thereof, and is provided with a through-bore 107 through from one axial end to an opposite axial end thereof. The resin tube connecting portion 103 includes one axial end portion 109 having an outer peripheral surface generally expanding gently in diameter toward an opposite axial end and formed like right triangle in cross-section on an opposite axial end thereof, and an opposite axial end portion 111 having an outer peripheral surface extending like a simple cylindrical shape on an opposite axial end of the one axial end portion 109. The opposite axial end portion 111 is provided on an outer peripheral surface with an annular projecting stop portion 113 like rectangular in cross-section and two annular projecting stop portions 115, 115 like right triangle in cross-section expanding in diameter toward an opposite axial end thereof. The annular projecting stop portion 113 and the annular projecting stop portions 115, 115 are arranged in axially spaced relation sequentially from one axial end to an opposite axial end of the opposite axial end portion 111. A resin tube is tightly fitted on an outer periphery or an outer peripheral surface of the resin tube connecting portion 103 and connected thereto. An outer peripheral surface 117 on one axial end portion of the opposite axial end portion 111, namely a portion between the one axial end portion 109 and the annular projecting stop portion 113 is formed in small diameter or in deep annular groove. Prior to fitting of a resin tube to the quick connector 95, at least one annular sealing member (not shown) is provided on the outer peripheral surface 117.

As well shown in FIG. 7, the pipe inserting portion 105 of the tubular connector housing 97 integrally has a large diameter projection receiving portion 119 on an opposite axial end, a seal holding portion 121 axially in the middle and a link portion 123 on one axial end thereof. The seal holding portion 121 is formed smaller in diameter than the projection receiving portion 119, and the link portion 123 is formed smaller in diameter than the seal holding portion 121. In the seal holding portion 121, a first O-ring (first annular sealing member) 125 of one axial end and a third O-ring (third annular sealing member) 127 of an opposite axial end are fitted in one axial end of an inner peripheral surface with intervening a collar 129 therebetween, in axially spaced and side by side relation with one another, and a small diameter resin bush (resin-bush) 131 is fitted in an opposite axial end thereof. The small diameter resin bush or the resin bush 131 is formed in a short tubular shape with an inner diameter generally identical to that of the link portion 123. The small diameter resin bush 131 is provided integrally with annular projections 133, 135 projecting somewhat radially outwardly on an opposite axial end portion and an axially middle portion of an outer peripheral surface respectively. An opposite axial end portion of an inner peripheral surface of the seal holding portion 121 is formed so as to correspond to an outer peripheral surface of the small diameter resin bush 131 in shape. The small diameter resin bush 131 is fitted in an opposite axial end portion of the seal holding portion 121 so that an annular end surface 137 on an opposite axial end is located to share a plane common with an annular abutment surface or an annular inside end surface 139 with narrow width formed on one axial end of inner side of the projection receiving portion 119 and expanding inwardly. The first O-ring 125 and the third O-ring 127 are maintained in an axial position, between an annular stepped surface 141 formed on one axial end of inner side of the seal holding portion 121 and the small diameter resin bush 131.

Figure 9:
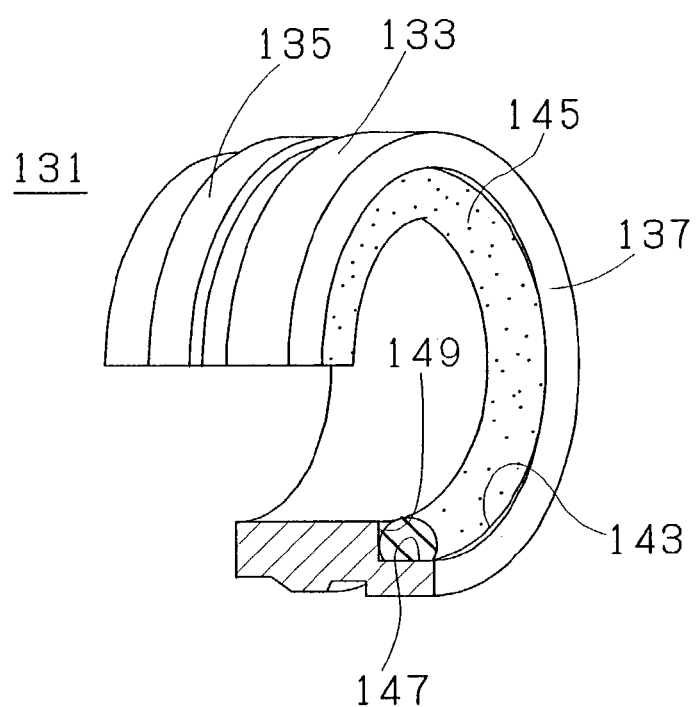
FIG. 9 is a perspective view of a small diameter resin bush adapted to the quick connector of another configuration according to the present invention.

As well shown in FIG. 9, the annular end surface 137 on an opposite axial end of the small diameter resin bush 131 is formed with an annular recessed portion 143 on an inner peripheral portion. In the annular recessed portion 143, namely in a large diameter portion formed short internally on an opposite axial end portion of the small diameter resin bush 131, a second O-ring or a third sealing ring (second annular sealing member) 145 is received. The second O-ring 145 is formed like semi-circle in cross-section so as to locate a cutting line of the semi-circle in cross-section or a flat end surface on an outer peripheral side. The second O-ring 145 is adhered to an annular peripheral surface 147 of the annular recessed portion 143 with an outer peripheral surface thereof. A diameter in cross-section or a cross-sectional diameter of the second O-ring 145 is dimensioned generally identical to an axial length of the annular peripheral surface 147, namely depth from the annular end surface 137 on an opposite axial end of the small diameter resin bush 131 to an annular bottom surface 149 of the annular recessed portion 143. The second O-ring 145 is received in the annular recessed portion 143 so that an axial position of an opposite axial end thereof generally corresponds to that of the annular end surface 137 of an opposite axial end of the small diameter resin bush 131. Prior to fitting the small diameter resin bush 131 in the seal holding portion 121, the second O-ring 145 is accommodated and secured in the small diameter resin bush 131. The small diameter resin bush 131 with the second O-ring 145 may be easily produced by two-color injection molding or two-shot molding, or insert molding at molding of the small diameter resin bush 131. That is, the second O-ring 145 is formed integrally in the small diameter resin bush 131 by two-color injection molding or two-shot molding, or insert molding. Here, the small diameter resin bush 131 is formed integrally with the second O-ring 145 therein.

The first O-ring 125 is made of FKM, and the third O-ring 127 is made of FVMQ of very excellent low-temperature resistant property. The first O-ring 125 may be also made of NBR type blend rubber. In some cases, the third O-ring 127 may be made of NBR type blend rubber, and in other cases, may be made of NBR, EPDM or TPO. The second O-ring 145 is made of FVMQ, but may be made of FKM, NBR-type blend rubber, EPDM or TPO. For the small diameter resin bush 131, thermoplastic resin such as PP or thermoplastic resin reinforced by glass fiber or the like are used. In view of adhesion properties with these resins at two-color injection molding or two-shot molding, it is effective to use TPO for the second O-ring 145.

The first O-ring 125, the third O-ring 127 and the second O-ring 145 construct sealing means 101. An axial space generally corresponding to thickness of the collar 129 is secured between the first O-ring 125 and the third O-ring 127, while an axial space generally corresponding to an axial distance from one axial end of the small diameter resin bush 131 to the annular recessed portion 143 is secured between the third O-ring 127 and the second O-ring 145. Thickness of the collar 129 is smaller than an axial distance from one axial end of the small diameter resin bush 131 to the annular recessed portion 143, specifically generally one-third of an axial space from one axial end of the small diameter resin bush 131 to the annular recessed portion 143. Therefore, an axial space secured between the first O-ring 125 and the third O-ring 127 is smaller than an axial space secured between the third O-ring 127 and the second O-ring 145, specifically, generally one-third of axial space secured between the third O-ring 127 and the second O-ring 145.

The generally cylindrical projection receiving portion 119 of the pipe inserting portion 105 is formed smaller in diameter, but larger in proportion of axial length to the diameter, compared to the projection receiving portion 11 of the quick connector 1. The projection receiving portion 119 is, just like the projection receiving portion 11, provided with engagement windows 151, 151 in diametrically symmetrical positions and in opposed relation with one another, and flat regions 153, 153 (only one flat region 153 is shown) on the outer peripheral surfaces respectively in diametrically symmetrical positions between the engagement windows 151, 151. One axial ends or one axial end surfaces 155, 155 of the engagement windows 151, 151 are located on an opposite axial end of the annular abutment surface 139 of inner side of the projection receiving portion 119 and the annular end surface 137 on an opposite axial end of the small diameter resin bush 131. A stepped portion is defined between one axial ends 155, 155 of the engagement windows 151, 151, and the annular abutment surface 139 of inner side of the projection receiving portion 119 and the annular end surface 137 of an opposite axial end of the small diameter resin bush 131. When a checker for verifying complete connection with a pipe is adapted, typically, engagement portions of the checker engage with the engagement windows 151, 151.

Figure 8:
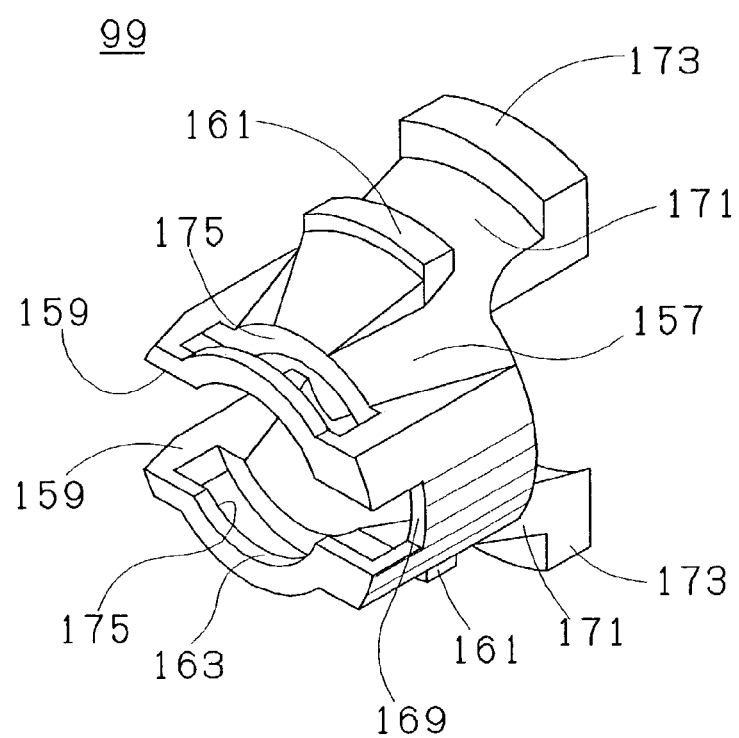
FIG. 8 is a perspective view of a retainer adapted to the quick connector of another configuration according to the present invention.

The retainer 99 made of PA is fitted in the projection receiving portion 119. As well shown in FIG. 8, this retainer 99 is, just like the retainer 5 of the quick connector 1, relatively flexible, and is formed so as to be resiliently deformable. The retainer 99 is formed corresponding to a shape of the projection receiving portion 119, smaller in diameter, but larger in a proportion of an axial length to a diameter compared to the retainer 5. The retainer 99 has a main body 157 of C-shape in cross-section, namely generally annular shape wherein a relatively large space for deformation is defined between circumferential opposite ends 159, 159 thereof. The main body 157 is provided with a pair of engagement tabs 161, 161 projecting radially outwardly in diametrically symmetrical positions on an opposite axial end portion thereof. An inner surface of the main body 157, except a portion diametrically opposed to the space for deformation, is tapered generally so as to reduce gradually an inner diameter thereof toward one axial end or in one axial direction. And, apart from a portion diametrically opposed to the space for deformation, one axial end portion 163 of the main body 157 is formed with an inner diameter almost identical to a pipe (refer to a reference numeral 165 in FIG. 10), and smaller than an annular engagement projection (refer to a reference numeral 167 in FIG. 10). The portion diametrically opposed to the space for deformation of the main body 157 has an inner surface shaped like a part of a cylindrical inner surface, and is formed with a notched portion 169 on one axial end portion 163 thereof.

A pair of relatively long operation arms 171, 171 are formed integrally on an opposite axial end portion of the main body 157 of the retainer 99 so as to extend inclining radially outwardly toward an opposite axial end or in an opposite axial direction from respective circumferential positions corresponding to the engagement tabs 161, 161. The operation arm 171 respectively, has a latching end 173 projecting radially outwardly on an opposite axial end portion thereof. The one axial end portion 163 of the main body 157 is provided with engagement slits 175, 175 extending circumferentially in opposed relation with one another. Thus configured retainer 99 is inserted and fitted in the projection receiving portion 119 so that the engagement tabs 161, 161 seat in the engagement windows 151, 151 of the projection receiving portion 119 and the latching ends 173, 173 engage with an opposite axial end 177 of the projection receiving portion 119. Axial projections 179, 179 are formed on an opposite axial end surface of the projection receiving portion 119 in circumferential positions corresponding to the flat regions 153, 153. The axial projections 179, 179 function to restrain rotational movement with respect to the latching ends 173, 173 of the operation arms 171, 171, therefore with respect to the retainer 99. Inner surfaces 181, 181 in arcuate cross-section of the retainer 99 in opposed relation with one another, extending from the operation arms 171, 171 to the engagement slits 175, 175, are generally tapered respectively in one axial direction toward the center or the central axis of the retainer 99. When the pipe 165 is inserted in the main body 157 of the retainer 99 through the end of the latching ends 173, 173 of the operation arms 171, 171, the annular engagement projection 167 of the pipe 165 necessarily or substantially necessarily abuts tapered inner surfaces 181, 181 of the retainer 99 at boundaries between the operation arms 171, 171 and the main body 157. Reference numeral 183 in FIG. 7 indicates an anti-rotation raised portion is formed integrally on an inner peripheral surface of the projection receiving potion 119 and fits in the notched portion 169 of the main body 157 of the retainer 99 to restrain rotational movement with respect to the retainer 99.

Figure 10:
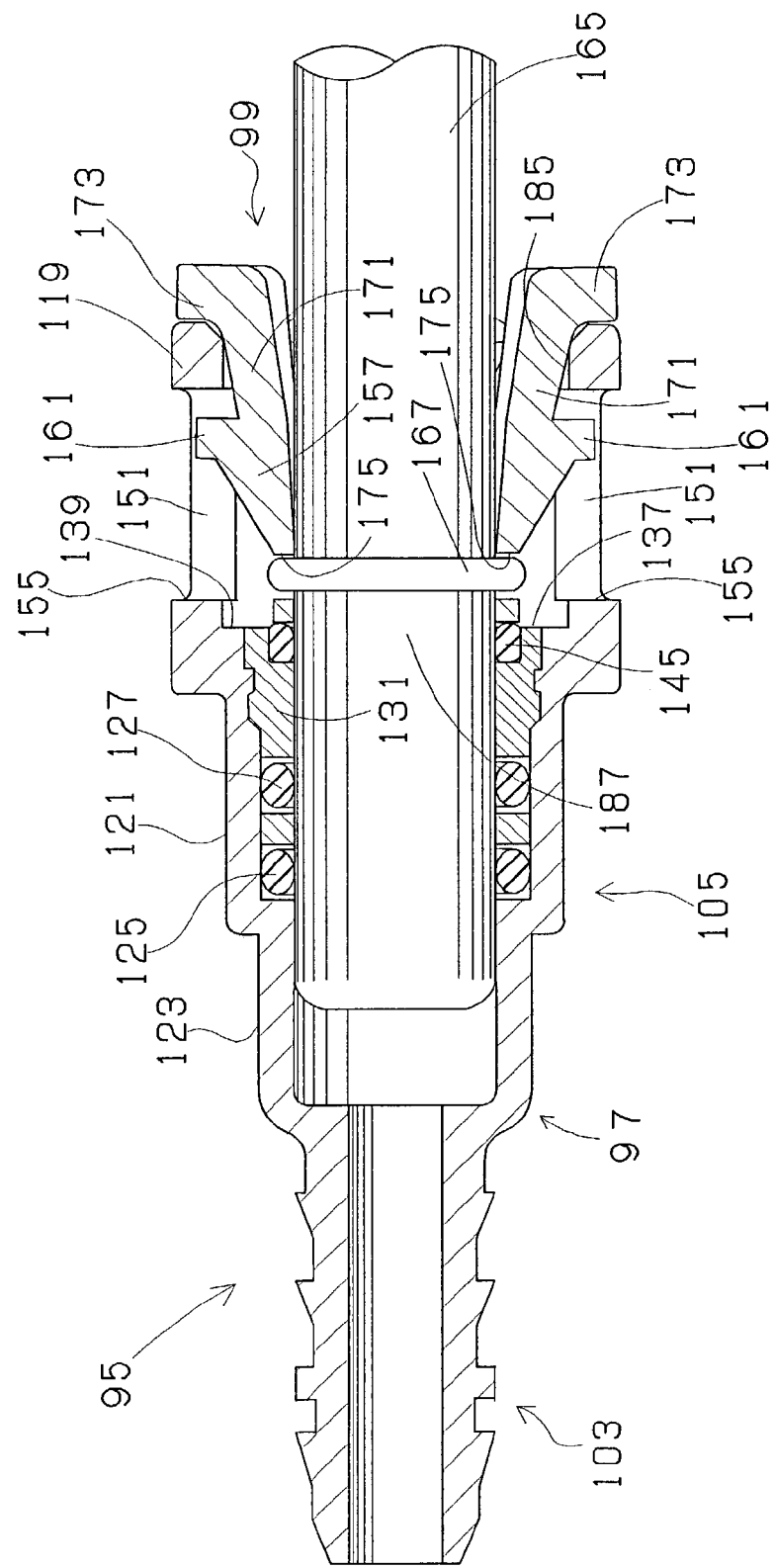
FIG. 10 is a cross-sectional view of the quick connector of another configuration according to the present invention wherein a pipe is connected.
Figure 11:
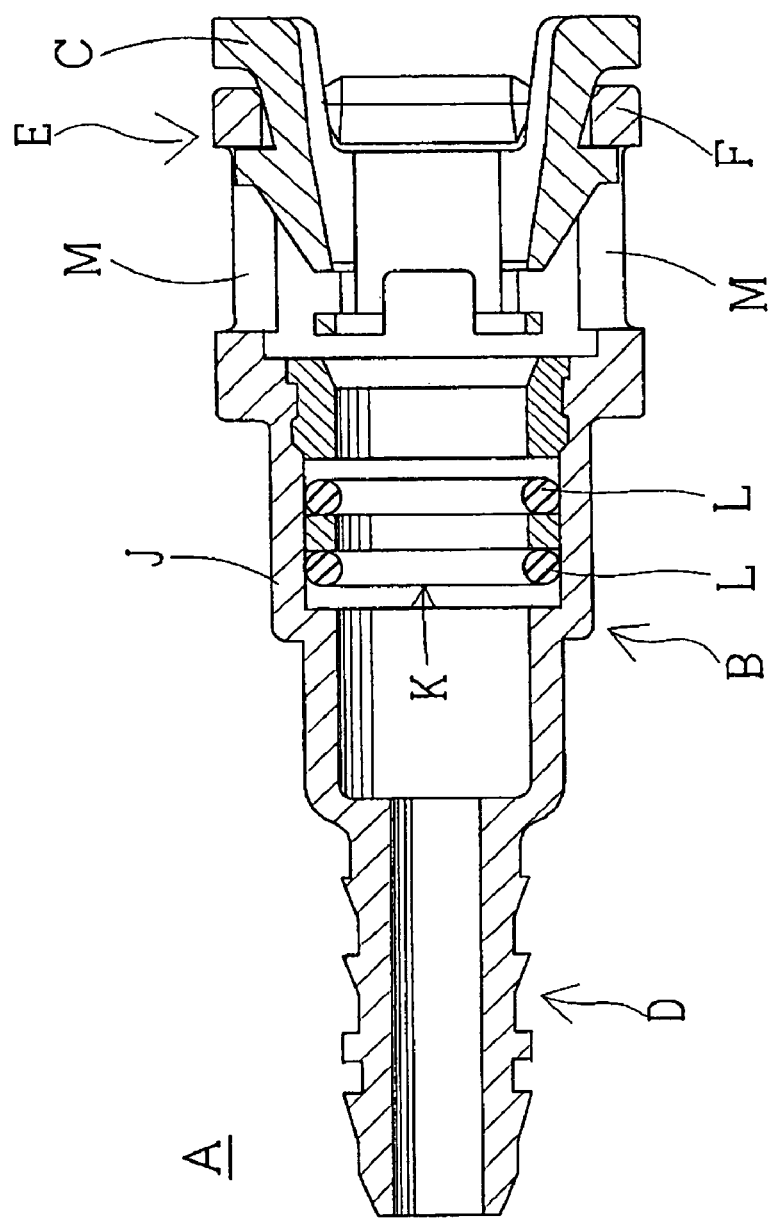
FIG. 11 is a cross-sectional view of a quick connector of the prior art.
Figure 12:
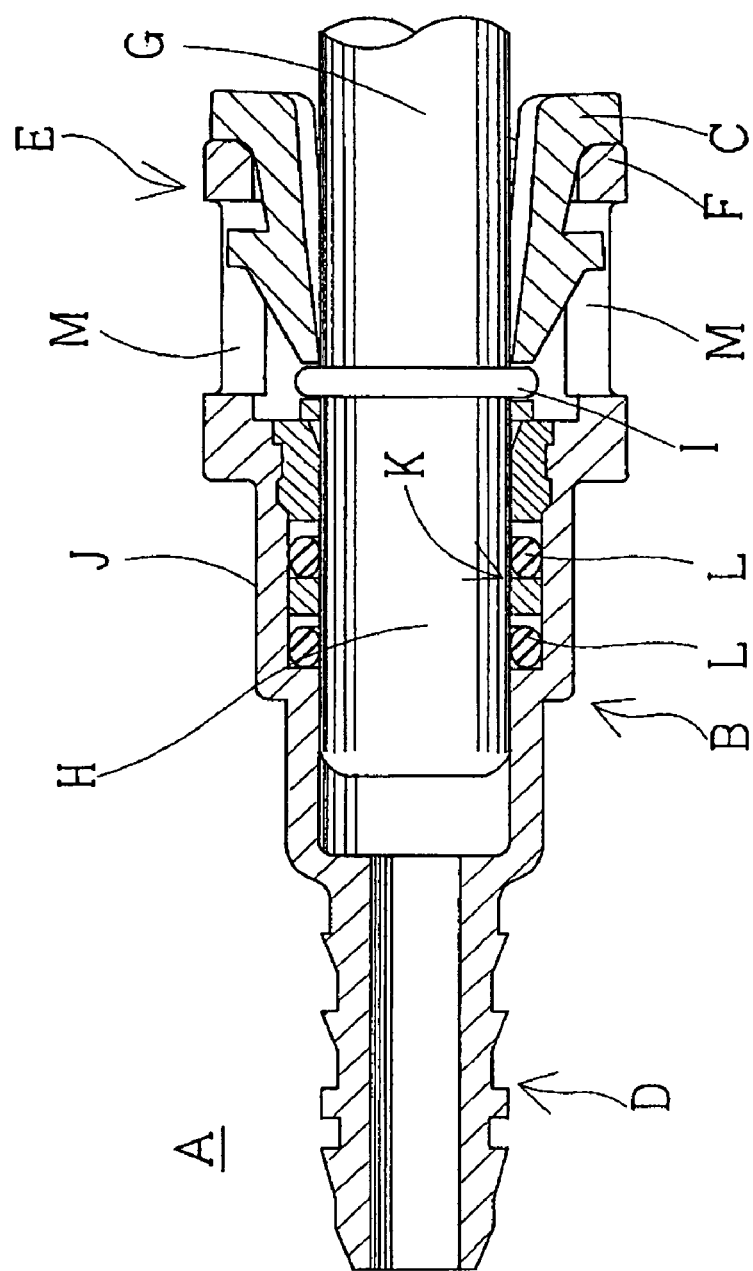
FIG. 12 is a cross-sectional view of the quick connector of the prior art wherein a pipe is connected.

As shown in FIG. 10, the pipe 165 to be joined with the tube, made of metal, is inserted into an insertion opening 185 on an end of the projection receiving portion 119, more specifically, in the main body 157 of the retainer 99 through the end of the latching ends 173, 173 of the operation arms 171, 171, and is to be fitted in the quick connector 95. Just like the pipe 71, the pipe 165 has an inserting end portion 187 on one axial end thereof wherein the annular engagement projection 167 is formed on an outer peripheral surface, but is dimensioned smaller in diameter than the pipe 71 so as to correspond to a dimension of the quick connector 95. The pipe 165 is pushed and fittingly inserted into the quick connector 95 or the tubular connector housing 97 so that the annular engagement projection 167 progresses radially expanding an inner surface of the main body 157 of the retainer 99 until the annular engagement projection 167 seats in the engagement slits 175, 175 in snap-engagement relation therewith. The annular engagement projection 167 which fits and snap-engages in the engagement slits 175, 175 of the main body 157 of the retainer 99 blocks or limits further axial in-and-out movement of the pipe 165 with respect to the quick connector 95. That is, the pipe 165 is thereby almost locked against relative axial movement in the quick connector 95. One axial end or inserting end of the pipe 165 reaches in the link portion 123 through the second O-ring 145, the third O-ring 127 and the first O-ring 125 and thereby a seal is formed by the first to the second O-rings 145, 127 and 125 between an outer peripheral surface of the pipe 165 and an inner peripheral surface of the quick connector 95, more specifically, between an outer peripheral surface of one axial end of the annular engagement projection 167 of the inserting end portion 187 of the pipe 165 and an inner peripheral surface of the seal holding portion 121. One axial end of the annular engagement projection 167 of the inserting end portion 187 of the pipe 165 is fittingly inserted without play in the small diameter resin bush 131 and the link portion 123 having an inner diameter generally identical to an outer diameter of the inserting end portion 187 of the pipe 165. The retainer 99 is usually fitted slightly loosely in the projection receiving portion 119 with slight axial play therein. However, at least when the pipe 165 is fully inserted therein, one axial end of the main body 157 is in abutment relation with respect to the annular abutment surface 139 and the annular end surface 137 of an opposite axial end of the small diameter resin bush 131. As a step is defined between one axial ends 155, 155 of the engagement windows 151, 151, and the annular abutment surface 139 and the annular end surface 137 on an opposite axial end of the small diameter resin bush 131, the engagement slits 175, 175 of the retainer 99 are shown in the engagement windows 151, 151 adjacent to one axial ends 155, 155, of the engagement windows 151, 151, when one axial end of the main body 157 is in abutment relation with the annular abutment surface 139 and the annular end surface 137 on an opposite axial end of the small diameter resin bush 131.

In the event of removing the pipe 165 from the quick connector 95, the latching ends 173, 173 of the operation arms 171, 171 engaging with the opposite axial end portions 177 of the projection receiving portion 119 are pressed radially inwardly from outside to narrow a radial space between the operation arms 171, 171, thus a radial space between the engagement tabs 161, 161. And, thereby the engagement tabs 161, 161 are out of the engagement windows 151, 151 and the retainer 99 can be relatively pulled out of the tubular connector housing 97. As the retainer 99 is relatively pulled out of the tubular connector housing 97, the pipe 165 is also pulled out of the quick connector 95 or the tubular connector housing 97 along with the retainer 99.

We claim:

1. A quick connector for a gasoline fuel path to be connected with a pipe including an inserting end portion provided with an annular engagement projection, comprising:

a tubular connector housing provided with a tube connecting portion on one axial end thereof and a projection receiving portion to receive the annular engagement projection of the pipe on an opposite axial end thereof, the tube connecting portion being formed to be fitted with a tube on an outer periphery thereof;

retainer means provided on the projection receiving portion and configured so as to snap-engage with the annular engagement projection of the pipe when the inserting end portion of the pipe is inserted into an insertion opening on an end of the projection receiving portion;

sealing means disposed in the tube connecting portion of the tubular connector housing to provide a seal between the tubular connector housing and the inserting end portion provided on the pipe, the sealing means including a first sealing member to provide a seal between the tubular connector housing and the pipe and a second sealing member to provide a seal between the tubular connector housing and the pipe; and an inner peripheral surface of the tube connecting portion being divided by an inwardly directed annular parting projection formed integrally therein into a first receiving portion on one axial end and a second receiving portion on an opposite axial end thereof;

the first sealing member being fitted in the first receiving portion and the second sealing member being fitted in the second receiving portion;

a first resin bush fitted on one axial end of the first receiving portion, and a second resin bush fitted on one axial end of the second receiving portion.

2. The quick connector as set forth in claim 1 wherein the inwardly directed annular parting projection has an inner diameter generally identical to an outer diameter of the inserting end portion of the pipe.

3. The quick connector as set forth in claim 1 wherein an outer peripheral surface of the tube connecting portion is provided with a projecting stop portion or projecting stop portions expanding in diameter toward the opposite axial end thereof.

4. The quick connector as set forth in claim 1, wherein;
the first sealing member being fitted in a space defined between the first resin bush and the inwardly directed annular parting projection, the second sealing member being fitted in a space defined between the second resin bush and the inwardly directed annular parting projection, the space with the first sealing member therein between the first resin bush and the inwardly directed annular parting projection and the space with the second sealing member therein between the second resin bush and the inwardly directed annular parting projection being configured to be closed by the inserting end portion of the pipe when the inserting end portion of the pipe is inserted in the tubular connector housing.

5. The quick connector as set forth in claim 4 wherein the first resin bush and the second resin bush each have an inner diameter generally identical to an outer diameter of the inserting end portion of the pipe.

6. The quick connector as set forth in claim 1 wherein the first sealing member is a first annular sealing member having gasoline resistant property.

7. The quick connector as set forth in claim 6 wherein the first annular sealing member is made of material selected form a group consisting of fluoro-type rubber and acrylonitrile-butadiene type rubber.

8. The quick connector as set forth in claim 1 wherein the second sealing member is a second annular sealing member having waterproofness and dust proofness properties.

9. The quick connector as set forth in claim 8 wherein the second annular sealing member is made of an elastic material of ozone resistant property.

10. The quick connector as set forth in claim 8 wherein the second annular sealing member is made of material selected from a group consisting of acrylonitrile-butadiene rubber (NBR), fluoro-rubber (FKM), acrylonitrile-butadiene rubber/polyvinyl chloride blend rubber (NBR/PVC), fluoro-silicone-rubber (FVMQ), ethylene-propylene-diene-rubber (EPDM) and thermoplastic olefin (TPO).

11. The quick connector as set forth in claim 1 wherein the sealing means further includes a third sealing member fitted near the first sealing member in the first receiving portion to provide a seal between the tubular connector housing and the pipe.

12. The quick connector as set forth in claim 11 wherein the third sealing member is a third annular sealing member having low-temperature resistant property.

13. The quick connector as set forth in claim 12 wherein the third annular sealing member is made of material selected from a group consisting of fluoro-silicone-rubber (FVMQ), acrylonitrile-butadiene rubber (NBR), acrylonitrile-butadiene rubber/polyvinyl chloride blend rubber (NBR/PVC), ethylene-propylene-diene-rubber (EPDM) and thermoplastic olefin (TPO).

14. The quick connector as set forth in claim 11 wherein the second resin-bush has an inner diameter generally identical to an outer diameter of the inserting end portion of the pipe, and the second sealing member is annular.

15. The quick connector as set forth in claim 11 wherein the pipe is inserted in the connector housing so that one axial end of the inserting end portion of the pipe passes sequentially through the second, third, first sealing members while the tube is fitted on the outer periphery of the tube connecting portion beyond sequentially axial positions of the first, third and second sealing members.

* * * * *